July 12, 1955  L. J. DEL SAVIO ET AL  2,712,846
APPARATUS FOR MAKING A POWDER PUFF
Filed Aug. 8, 1951  2 Sheets-Sheet 1
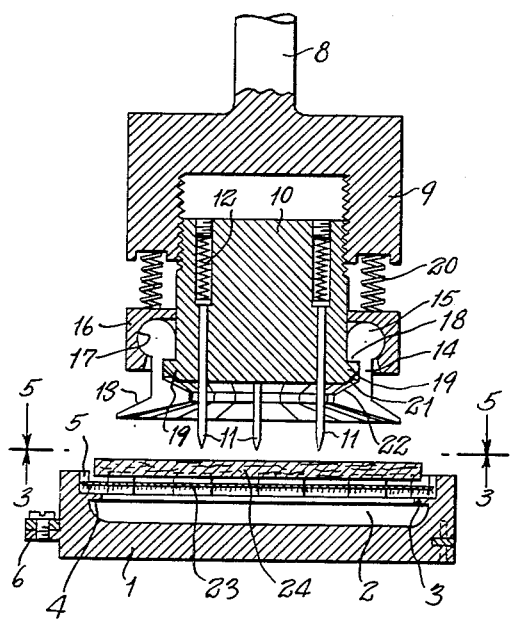
Fig. 1.
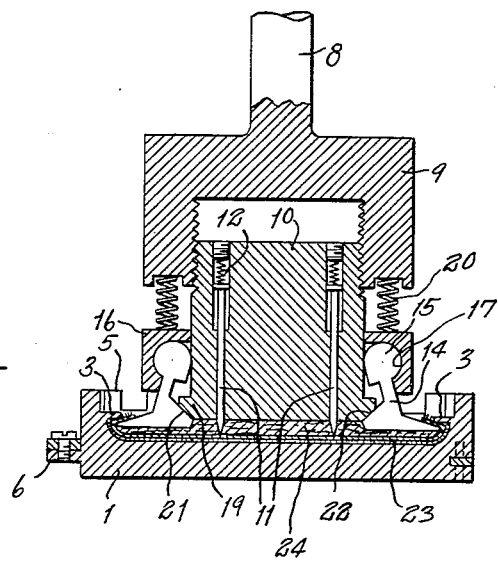
Fig. 2.
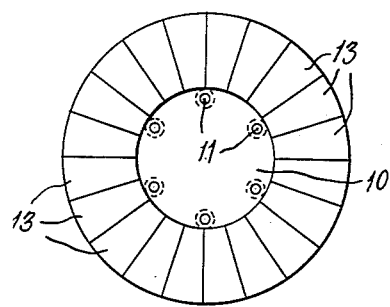
Fig. 3.
Fig. 4.
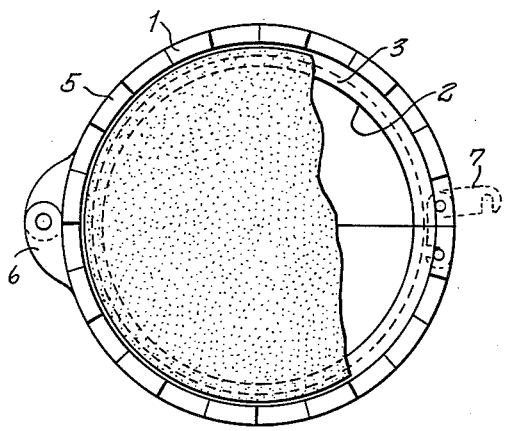
Fig. 5.
INVENTORS
LAWRENCE J. DEL SAVIO
BY JOHN B. DEL SAVIO
Kenyon & Kenyon
ATTORNEYS

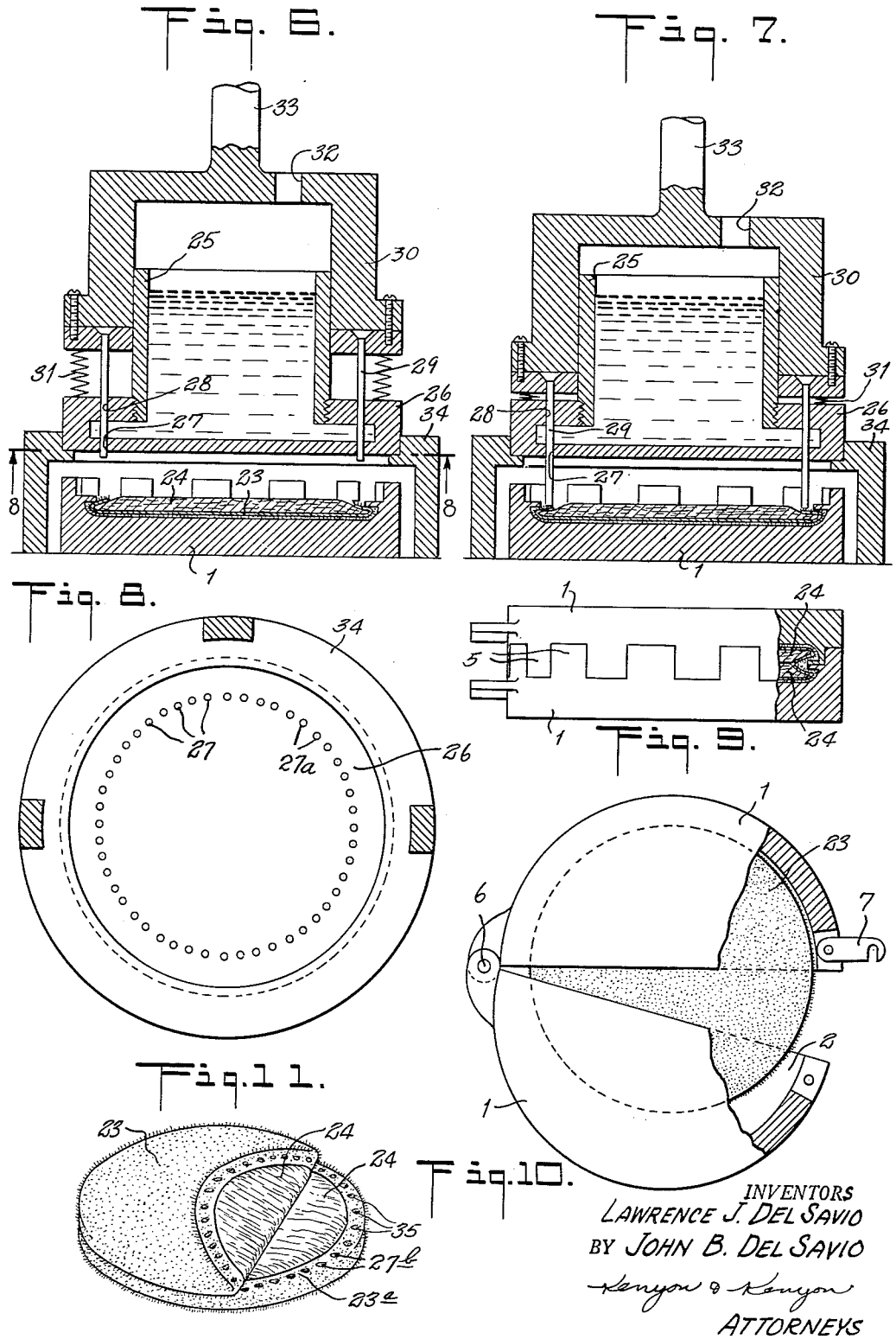

United States Patent Office 2,712,846
Patented July 12, 1955

2,712,846

APPARATUS FOR MAKING A POWDER PUFF

Lawrence J. Del Savio and John B. Del Savio, Bronx, N. Y., assignors to A. J. Siris Products Corp., New York, N. Y., a corporation of New York Application August 8, 1951, Serial No. 240,868

4 Claims. (Cl. 154—1.8)

This invention relates to a method and apparatus for making powder puffs and the like and to a powder puff per se.

One of the objects is to provide a method and apparatus particularly adapted for making powder puffs and having the advantages of more accurately forming or shaping the various layers and fastening them together by means of fluid adhesive in a manner reducing or eliminating trouble caused by the adhesive being forced radially from the seam onto the exposed surfaces. Another object is to provide a powder puff having those layers interfastened by an adhesive in such a fashion as to provide the puff with the flexibility and general feel of a hand sewn powder puff. A more general object is to provide for the rapid assembly and interfastening of various layers so as to produce a powder puff having the general characteristics of a hand sewn puff. Other objects may be inferred from the following.

As a summary of the invention the method and apparatus include the use of a die having a cavity shaped to form one side of the powder puff and with a flange overhanging the mouth of this cavity. One or more layers are placed on top of this die and a former is moved down so as to push the layer or layers into the cavity. This former features a plurality of expansible and contractible fingers and the former includes means for expanding these fingers so as to form or tuck the layer or layers under the die flange and provide the layer or layers with a flange portion for seaming. The former has means for retracting the fingers so that the former may then be removed from the die cavity.

This die is also used as a carrier for the layer or layers and it is next moved under an adhesive applier. This device includes a container for a fluid but rather viscous adhesive. The bottom of the container has holes arranged in a pattern registering with interspaced locations extending peripherally around the flange of the previously formed puff portion. Reciprocating plungers work in these holes so as to normally block the flow of adhesive therethrough. These plungers are constructed and arranged so that they may be raised slightly above these holes to permit the adhesive to flow over these holes, the plungers then moving downwardly so as to, in effect, punch out discs of the adhesive which is then transferred, on the plungers' ends, to the flange of the puff portion. This applies a plurality of interspaced spots of fluid adhesive to this flange.

Completion of the puff is effected by applying a layer to the adhesively spotted flange and applying light pressure until the adhesive sets. Since the spots are interspaced there is room between them for the adhesive to flow and this avoids any trouble from being caused by the adhesive being extruded or oozing radially to the outside of the seam and onto the outside of the powder puff where it would be objectionable. Usually a double-faced powder puff is desired and such a puff may be made by forming a second puff portion like the one described and applying it to the adhesively spotted flange of the first portion.

The resulting powder puff is characterized by having its seam fastened together by the interspaced spots of adhesive. This provides the further advantage that the resulting puff is, in effect, stitched together. Therefore, it has the flexibility and general feel of a hand sewn product. However, to some extent the resulting puff is superior to a hand sewn article since its seam, although spot secured, does not include the bulk represented by thread which must be used for either hand or machine stitching.

One specific form of the invention is schematically illustrated by the accompanying drawings in which:

Fig. 1 is a vertical cross section of the die and former with the latter in its up position and its fingers retracted;

Fig. 2 is the same as Fig. 1 excepting that the former is in its down position with its fingers expanded.

Fig. 3 is a bottom view of the former taken from Fig. 1 on the line 3—3;

Fig. 4 also shows the bottom of the former but with the fingers expanded;

Fig. 5 is a top view of the die taken along the line 5—5 in Fig. 1;

Fig. 6 is a vertical section of the adhesive applying device as it appears with the plungers closing the adhesive container's holes;

Fig. 7 is the same as Fig. 6 excepting that the plungers are shown in their adhesive applying position;

Fig. 8 is a horizontal section taken on the line 8—8 in Fig. 6;

Fig. 9 is a partly sectioned side view of two of the dies superimposed together for the purpose of combining two powder puff portions;

Fig. 10 is a top view of Fig. 9 showing the manner in which the finished puff is removed from the combined dies;

Fig. 11 shows the finished powder puff with the layers partly pulled apart to show the seam construction.

The die 1 has the cavity 2 as previously described and the overhanging flange 3. This flange has a flat horizontal bottom face 4. The periphery of the die is castellated at 5. The die is radially slit on a vertical plane into two halves which are interconnected by a hinge 6, a diametrically opposite releasable fastening 7 holding the halves together during the use of the die.

The former device is mounted above this die by a depending shaft 8 having on its bottom end an internally threaded socket 9 into which is screwed a cylindrical post 10 from the bottom of which retractable anchor pins 11 project downwardly. These pins are downwardly biased by compression springs 12, the pins and springs being reciprocatively housed in suitable bores formed in the post 10. The fingers 13 each comprise a flat sided element and these fingers are packed around the lower end of the post 10. Each finger is supported by a depending arm 14 swingingly anchored at its upper end by a journal portion 15 having an edge shaped as a cylindrical segment. These various segments are journaled in a bearing ring 16 reciprocatively encircling the post 10 and having bearing surfaces 17 in the form of cylindrical segments fitting the journal parts 15. The surface 17 is provided by an inwardly facing and downwardly open groove formed in the ring 16, the post 10 preventing the parts from falling inwardly from this groove. Each finger journal part 15 has a shoulder 18 and the lower end of the post 10 has an outwardly projecting flange 19 which engages the various shoulders 18 and holds the finger elements retracted when the ring 16 is pushed downwardly which it is in an elastic manner by a series of coil compression springs 20 positioned between the parts 9 and 16. The bottom corner of this flange 19 provides an annular cam or wedge surface 21 and each of the fingers 13 has an inwardly projecting heel or back end formed to provide a cam surface 22. The cam surfaces 21 and 22 are contoured and arranged to coact when the ring 16 is moved upwardly on the post 10, whereby to cause the expansion of the fingers. The outer ends of the fingers 13 are contoured to fit up under the surface 4 of the die flange 3 whereby to cause the inturning or flanging of the powder puff layer.

Because the former device is mounted by the shaft 8 and socket 9, as described above, these parts 8 and 9 form a mount for all of the other parts of the former device including the fingers.

In Fig. 1 a disc layer of pile fabric 23 and a filler pad 24 are positioned on the die 1 above the flange 3 with the castellated die portion 5 positioning the layer 23. In Fig. 2 the forming action is illustrated, the various fingers having caused the inturning or flanging of the layer 23. This is done to provide a substantailly horizontal flange due to the flat surface 4 of the die flange 3, the tips of the fingers 13 being shaped to accomplish this action. The ring 16 may be pushed upwardly on the post 10 by the fingers working against the bottom of the die cavity and stopping the ring 16 while the plunger 8 is caused to move further downwardly. If desired the ring 16 may be provided with a mechanical stop adjusted to halt its descent with the balance of the former device and thereby cause relative movement between the ring 16 and the post 10.

During the action of the former the pins 11 pierce or enter the layer 23 to positively anchor it against radial or lateral shifting as the fingers 13 act. These pins 11 project far enough downwardly to go to work before the fingers 13 touch the layer 23. If a filler pad is included the pins 11 pierce this pad and then pierce or engage the layer 23.

With the first layer portion formed or shaped the die 1, now functioning as a carrier, is moved beneath the adhesive spot applier shown by Figs. 6 through 8. These figures show the addition of a filler pad 24.

This adhesive spot applier includes a cylindrical adhesive container cup 25 having a radially enlarged or hollow flanged bottom periphery or rim 26 through which the previously mentioned holes 27 are formed in, of course, the bottom wall. These holes are contoured to form the peripheral shape of the powder puff portion's flange, as is shown by Fig. 8. The radially enlarged rim 26 also has holes 28 in its upper wall which registered with the holes 27 in each instance, and the various plungers 29, one for each hole, reciprocate vertically through both the holes 27 and 28 in each instance. The upper ends of these plungers are mounted by the bottom edge of a cylinder 30 which telescopes over the outside of the cup 25 in a reciprocative manner, compression coil springs 31 biasing the various plungers 29 upwardly. The cylinder 30 is mounted by a reciprocating rod 33 so that it may be moved up and down to reciprocate the plungers 29 simultaneously, and the closed top wall of the cylinder 30 has a hole 32 through which the fluid adhesive may be poured when necessary. The rim portion 26 of the cup is positioned immovably by a bracket 34, the latter being constructed and arranged so that the die 1 may be moved beneath it under the various plungers 29.

With the cup 25 containing viscous fluid adhesive, the rod 33 is raised so as to lift the plungers 29 more or less above the holes 27, the clearing distance depending on the amount of adhesive desired. The adhesive then flows over the holes and the plungers 29 are moved downwardly, by motion of the rod 33, so as to punch out spots of the adhesive. These spots are carried along on the bottom ends of the plungers and thus transferred by the latter to the flange formed on the powder puff portion, the plungers then being lifted to the position shown by Fig. 6. Thus a cycle is established, the various plungers first lifting to clear the holes slightly, then going downwardly to punch out and apply the adhesive spots, and then returning so as to block the various holes and prevent the adhesive from leaking through them.

The viscosity of the adhesive should be such that when the holes are opened the adhesive does not promptly run down through the holes. In turn, the diameters of the holes, and of course of the plungers 29, should be relatively small, this being indicated in any event because the adhesive spots applied to the powder puff flange should be small. The interspacing 27a of the holes should be such that space 27b is provided between the applied adhesive spots for the circumferential flow previously described, but the spots should be close enough together to properly interfasten the powder puff elements.

With two of the dies 1 containing the thus processed powder puff portions, for example, the two dies may be combined with their castellated portions serving to secure accurate orientation. Fig. 9 shows two dies combined as described. This is in conjunction with making a double-faced powder puff. The pile of the layer 23 of course faces outwardly and this means that the adhesive spots were applied to the pile side. Therefore easy adhesion is effected without the use of material pressure. The adhesive spots may be applied to either or both of the flanges of the two combined powder puff portions. Although viscous, the adhesive naturally flows prior to setting since setting requires time insofar as all practical and suitable adhesives are concerned. Since the adhesive can flow in all directions and is not confined circumferentially of the puff in any one instance, the adhesive is not forced to flow radially outwardly where it would get on the outside of the powder puff seam. The completed powder puff may be removed from the combined dies by releasing the fastening 7 and swinging the die halves apart as indicated by Fig. 10.

Fig. 11 shows the finished puff with the two pile fabric layers 23, such as velours, joined together in superimposed relation about the inside filler pad 24. Spots of adhesive 35 are shown spaced around the inturned flange portion 23a of the lower one of the layers 23. This figure shows the puff as though it had been forceably partly torn apart, whereby to indicate the adhesively stitched feature. This contributes the desired flexibility and feel, further enhanced by the fact the the spots are applied to the pile of the fabric so as to achieve further flexibility.

The completed puffs may be removed from the combined dies prior to complete setting of the adhesive. The puffs are usually piled one on top of another and this light pressure, due to weight, normally provides firmly interfastened powder puffs after complete setting of the adhesive.

We claim:

1. Apparatus for making a powder puff, including a die having a cavity shaped to form a layer into one side of the desired article and having an overhanging flange surrounding said cavity, and a former including a mount, a plurality of retracting and expanding fingers positioned on said mount to clear said flange when retracted and to define substantially the peripheral shape of said cavity when said fingers are expanded, said mount being movable relative to said die to move said fingers into said cavity and carry the layer therein, and means for expanding said fingers when they are in said die cavity, said fingers having ends fitting under said flange in said cavity.

2. Apparatus for making a powder puff, including a die having a cavity shaped to form a layer into one side of the desired article and having an overhanging flange surrounding said cavity, and a former including a mount, a plurality of retracting and expanding fingers positioned on said mount to clear said flange when retracted and to define substantially the peripheral shape of said cavity when said fingers are expanded, said mount being movable relative to said die to move said fingers into said cavity and carry the layer therein, and means for expanding said fingers when they are in said die cavity, said fingers having ends fitting under said flange in said cavity, and said mount positioning downwardly-biased retractible pins arranged with respect to said fingers so that said pins engage the layer being formed in said cavity and anchor said layer therein against lateral shifting during expansion of said fingers.

3. Apparatus for making a powder puff, including a die having a cavity shaped to form a layer into one side of the desired article and having an overhanging flange surrounding said cavity, and a former including a mount, a plurality of retracting and expanding fingers positioned on said mount to clear said flange when retracted and to define substantially the peripheral shape of said cavity when said fingers are expanded, said mount being movable relative to said die to move said fingers into said cavity and carry the layer therein, and means for expanding said fingers when they are in said die cavity, said fingers having ends fitting under said flange in said cavity, said fingers depending from arms having cylindrical journals and said mount including a central post encircled by said ends and a ring having a cylindrical bearing groove fitted over said journals and retaining them swingingly against said post, said post and the surfaces of said fingers adjacent thereto having coacting cam surfaces shaped and arranged to cause expansion of said arms when said post is moved downwardly relative to said ring, the inner parts of said journals having shoulders and said post having a flange positioned to engage said shoulders and retract said arms when said post is moved upwardly relative to said ring.

4. Apparatus for making a powder puff, including a die having a cavity shaped to form a layer into one side of the desired article and having an overhanging flange surrounding said cavity, and a former including a mount, a plurality of retracting and expanding fingers positioned on said mount to clear said flange when retracted and to define substantially the peripheral shape of said cavity when said fingers are expanded, said mount being movable relative to said die to move said fingers into said cavity and carry the layer therein, and means for expanding said fingers when they are in said die cavity, said fingers having ends fitting under said flange in said cavity, said fingers depending from arms having cylindrical journals and said mount including a central post encircled by said ends and a ring having a cylindrical bearing groove fitted over said journals and retaining them swingingly against said post, said post and the surfaces of said fingers adjacent thereto having coacting cam surfaces shaped and arranged to cause expansion of said arms when said post is moved downwardly relative to said ring, the inner parts of said journals having shoulders and said post having a flange positioned to engage said shoulders and retract said arms when said post is moved upwardly relative to said ring, said post having pins projecting retractively therefrom forwardly within said fingers.

References Cited in the file of this patent

UNITED STATES PATENTS

| | | |
|---|---|---|
| 1,838,099 | Keith | Dec. 29, 1931 |
| 1,838,118 | Smith | Dec. 29, 1931 |
| 1,887,194 | Charrain | Nov. 8, 1932 |
| 2,190,894 | Thompson | Feb. 20, 1940 |
| 2,368,445 | Brandt | Jan. 30, 1945 |
| 2,484,336 | Epstein et al. | Oct. 11, 1949 |
| 2,672,178 | Levy-Hawes et al. | Mar. 16, 1954 |
| 2,692,221 | Bihler | Oct. 19, 1954 |